May 29, 1923.
H. R. MITCHELL
VARIABLE ACTION SHOCK ABSORBER
Filed May 23, 1922 2 Sheets-Sheet 1
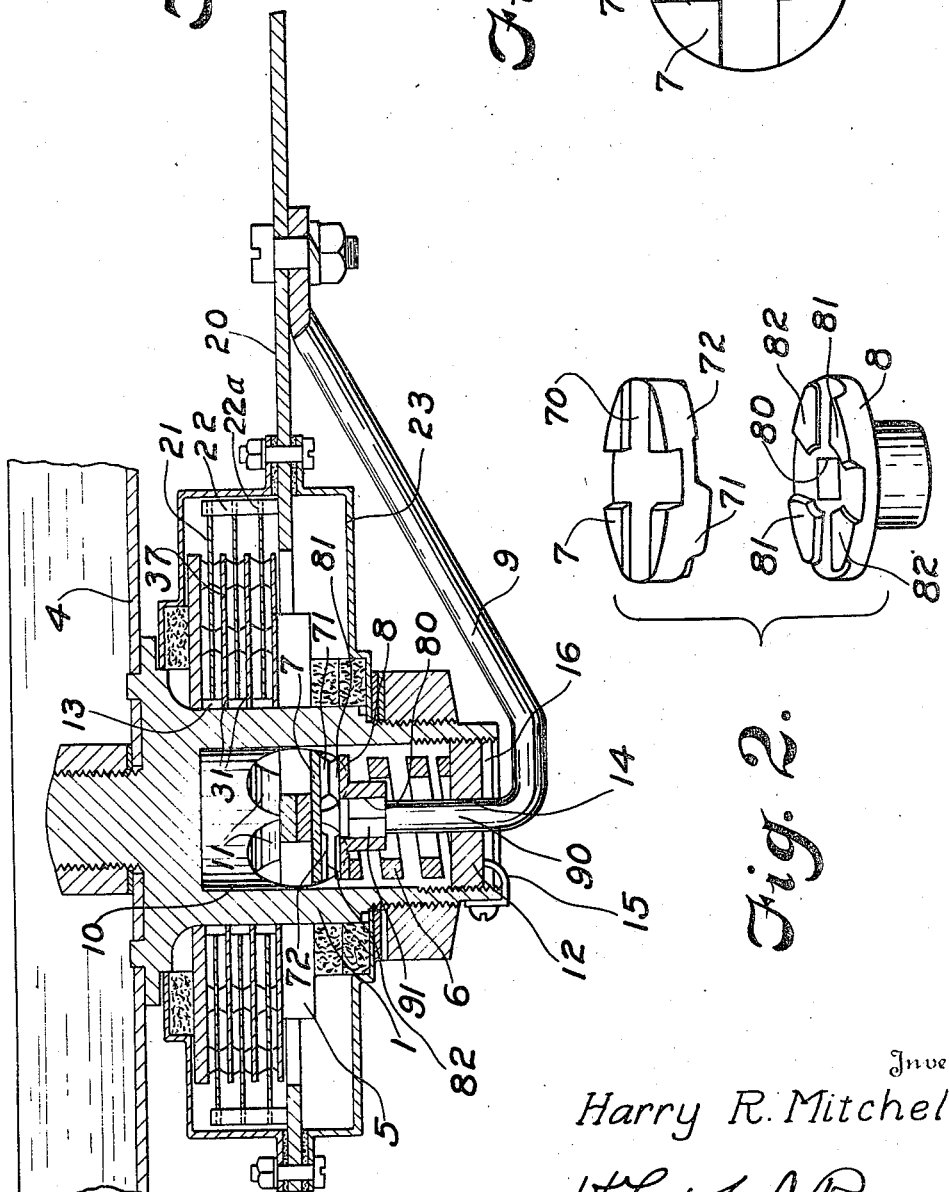
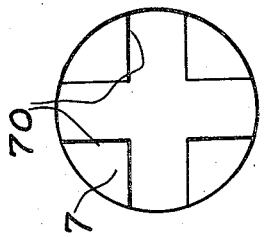
Inventor
Harry R. Mitchell
By H.L. & G.L. Reynolds
Attorney

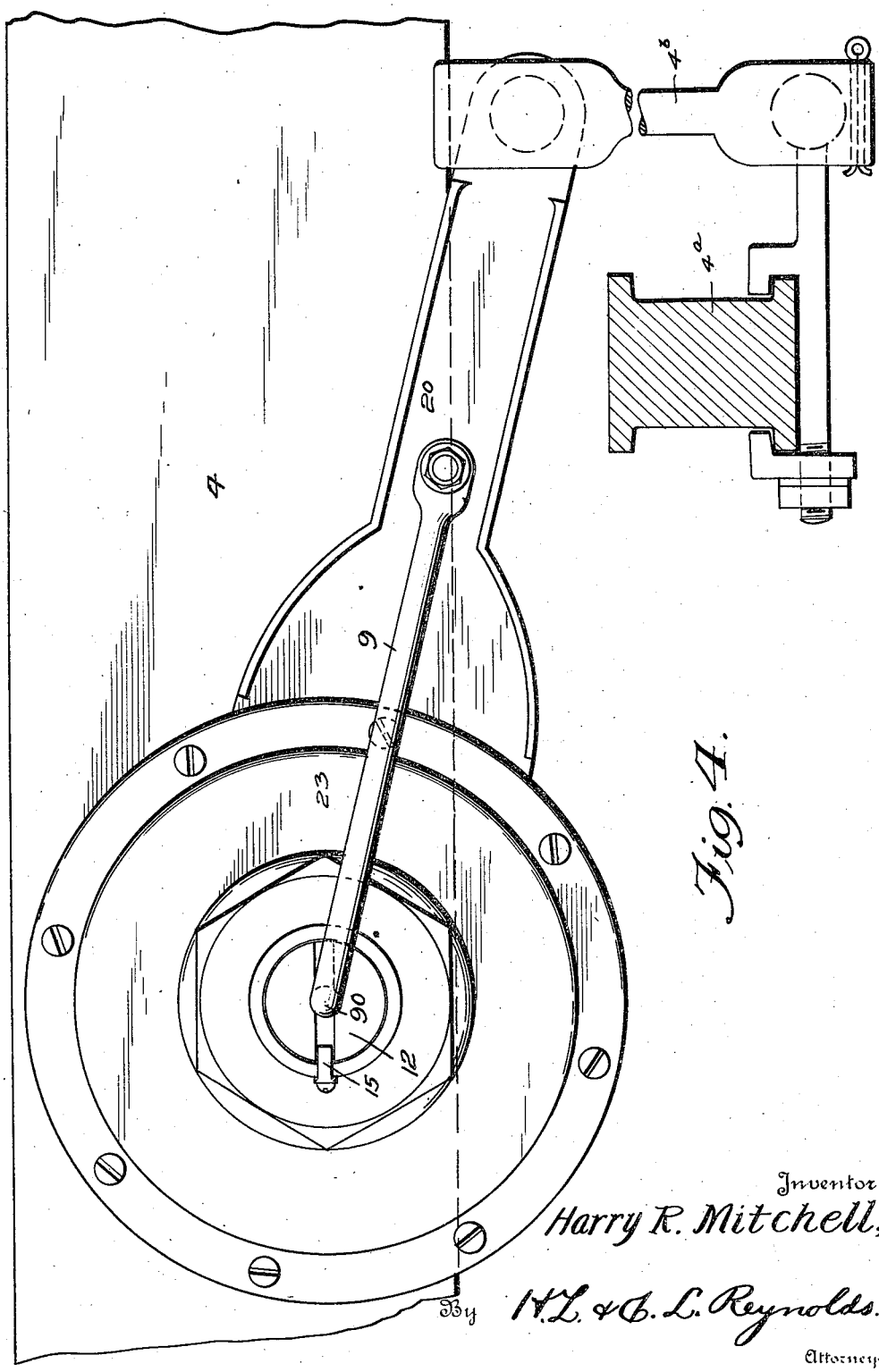

Patented May 29, 1923.

1,456,856

UNITED STATES PATENT OFFICE.

HARRY R. MITCHELL, OF SEATTLE, WASHINGTON, ASSIGNOR TO MITCHELL PRODUCTS COMPANY, OF SEATTLE, WASHINGTON, A CORPORATION OF WASHINGTON.

VARIABLE-ACTION SHOCK ABSORBER.

Application filed May 23, 1922. Serial No. 562,967.

*To all whom it may concern:*

Be it known that I, HARRY R. MITCHELL, a citizen of the United States of America, and resident of the city of Seattle, in the county of King and State of Washington, have invented certain new and useful Improvements in Variable-Action Shock Absorbers, of which the following is a specification.

My invention relates to shock absorbers and particularly to a shock absorber of the snubbing type employing relatively movable frictional drag members. The present device is particularly an improvement upon shock absorbers of the type shown in my co-pending application, Ser. No. 531,574.

It is an important object of the present invention to provide means whereby the force applied by the means which controls the frictional drag between the relatively movable members may be varied in accordance with the movement of these frictional members to one side or the other of a normal neutral position, and whereby when the vehicle body moves downward towards the axle a frictional drag of a given amount is applied, and when the vehicle body moves upward from the axle beyond its normal neutral position an increased frictional drag is applied.

A further object is to provide in such a shock absorber a neutral position between certain limits, whereby substantially no frictional drag is applied to the relatively movable members for slight oscillations one side or the other of the normal position, such as would occur in ordinary running over fairly rough paving.

A further object is the provision of cam means for controlling the application of the frictional drag to the relatively movable members, which will not be bulky and which will readily fit within a shock absorber of the type shown in my co-pending application referred to above.

My invention comprises those novel parts and combinations thereof which are shown in the accompanying drawings, described in the specification and particularly defined by the claims terminating the same.

In the accompanying drawings I have shown my invention in the form which is now preferred by me.

Figure 1 is an axial section through my shock absorber showing parts in the position they would assume when the vehicle body is moved upwardly away from the axle.

Figure 2 is a perspective of the controlling cams shown separated.

Figure 3 is a plan view of the inner face of the innermost cam and Fig. 4 is a side view of the shock absorber.

The principles of my invention are applicable to any shock absorber which employs two relatively movable frictional members and a spring for applying pressure to said members to create a frictional drag therebetween. It may conveniently be described, however, in connection with the device shown in my co-pending application referred to above, and I shall therefore describe it only in that connection.

As in my previous application, a hub sleeve forms the foundation upon which are mounted two series of frictionally engaged plates 21 and 37. The plates 37 are engaged with the hub 1 so that they may move axially of the hub, but are non-rotative relative thereto. This result may be secured by engagement of inwardly projecting fingers 31 in suitable axially extending grooves 13 of the hub. The plates 21 are engaged by an arm 20 to rotate therewith, both the plates and the arm being rotatable about the hub 1. Pins 22 engageable in recesses 22$^a$ in the periphery of the plates 21 serve to connect the plates with the arm 20. A casing 23 surrounds the plates 21 and 37 and a portion of the hub 1, about which it is rotatable through its securement to the arm 20. The hub 1, it will be understood, is secured to a vehicle part, as the chassis frame 4, and the arm 20 is intended to be connected to a relatively movable vehicle part, as, for instance, the axle 4$^a$ by a link 4$^b$.

Within the casing 23 and bearing upon the outermost plate 3 I have provided a spider 5. This is formed of two crossed arms which project through two transverse bores 11 in the hub sleeve 1. The hub sleeve also has an axial bore 10 within which lies a compression spring 6. The outer end of the bore 10 is closed by a nut 12 which screws into its open end and which acts as an adjustable thrust member for one end of the spring 6. The inner end of the spring 6 acts through the spider 5 to apply pressure to the plates 2 and 3, the application thereof being controlled by means which I will now describe.

Two cam disks are provided which are interposed between the spider 5 and the inner end of the spring 6. The inner disk 7 may be provided with a pair of crossed grooves 70, as best shown in Figures 2 and 3, which are adapted to straddle the arms of the spider 5 to secure the disk 7 thereon against rotation. A second cam disk 8 is interposed between the cam disk 7 and the inner end of the spring 6. This cam disk is provided with a non-circular recess 80 with which is engaged a similarly shaped end 91 of an arm 9. Axial sliding movement of the disk 8 upon the end 91 is thus permitted. The arm 9 is provided with an inwardly bent extension 90 which carries the squared end 91 and which projects through an aperture 14 in the nut 12. The outer end of the arm 9 is secured to the arm 20. In order to prevent the nut 12 from working loose due to oscillation of the end 90 of the arm 9 therein, a holding finger 15, engaging a suitable recess or groove 16 in the nut, may be provided for this purpose.

The cam disks 7 and 8 carry two series of complemental cams. One series, 71 and 81, are shown in engagement in Figure 1. These cams are higher than the cams 72 and 82, and consequently when the cams 71 and 81 are in engagement with cams 72 and 82, are separated.

In the position shown in Figure 1 the spring 6 has been compressed by the engagement of the cams 71 and 81, and the plates 21 and 37 are thereby pressed together with considerable force. However, when the cams 72 are engaged with the cams 81 the spring 6 is still compressed, but to a lesser degree, and consequently a lesser frictional drag is applied between the plates 21 and 37. The space between the cams 71 and 72 and 81 and 82 is so proportioned that a slight amount of oscillation may occur before the cams engage to increase the spring pressure.

When the vehicle is going over a slightly rough surface the arm 20 will oscillate relative to the hub 1 to a slight extent, but this will not be sufficient to engage either the cams 72 and 82 or 71 and 81. However, when the vehicle body moves downward relative to the axle the cams 72 and 81 will engage, as will the cams 71 and 82. This causes an increased pressure in the spring 6 and checks the downward movement of the body. However, if the body is thrown upward beyond its normal position, the cams 71 and 81 engage and consequently an increased checking effect is produced by the increased pressure between the plates 21 and 37.

By the arrangement described excessive downward movement of the vehicle body, which is resisted by the vehicle springs, is checked somewhat, but its upward movement, which is assisted by the springs, is more severely checked. Breakage of the springs, which is generally caused by unrestrained relaxation, is prevented, and the vehicle rides very smoothly.

What I claim as my invention is:

1. In a shock absorber comprising two series of relatively oscillatable friction plates and a spring operable to press said plates together, a pair of cam disks each oscillatable with its respective series of plates, and each having two sets of cams complemental to those on the other cam disks, said cam disks being operatively connected to said spring to vary the pressure between said plates, one set of complemental cams having a greater throw than the other set, and one set being engageable upon oscillation upon one side of a normal neutral position, and the other set being engageable upon oscillation upon the opposite side of said neutral position, whereby the spring pressure is differently varied.

2. In a shock absorber, in combination, a hub adapted to be connected to a vehicle part and axially bored at one end, and having transverse bores intersecting the axial bore, two complemental series of friction plates, one series being fixed to said hub and the other being oscillatable relative to the first series, an arm fixed to the second series and adapted to be secured to a second vehicle part, a spider projecting through said transverse bores and bearing upon said friction plates, a spring in said axial bore operable to press said plates into frictional engagement, and cam members within said bore between the spring and spider, and relatively oscillatable with the hub and arm, respectively, thereby to increase the pressure between said plates.

3. In a shock absorber, in combination, a hub adapted to be connected to a vehicle part and axially bored at one end, and having transverse bores intersecting the axial bore, two complemental series of friction plates, one series being fixed to said hub and the other being oscillatable relative to the first series, an arm fixed to the second series and adapted to be secured to a second vehicle part, a spider projecting through said transverse bores and bearing upon said friction plates, a spring in said axial bore operable to press said plates into frictional engagement, a cam disk having grooves upon its inner face adapted to span said spider, and having cams upon its outer face, a second cam disk having complemental cams and interposed between said spring and the first cam disk, and means for oscillating said second cam disk with said arm.

4. In a shock absorber, in combination, a hub adapted to be connected to a vehicle part and axially bored at one end, and having transverse bores intersecting the axial bore, two complemental series of friction plates, one series being fixed to said hub and the other being oscillatable relative to the first series, an arm fixed to the second series and adapted to be secured to a second vehicle part, a spider projecting through said transverse bores and bearing upon said friction plates, a spring in said axial bore operable to press said plates into frictional engagement, a cam disk adapted to be secured to said spider, a second cam disk interposed between the spring and the first cam disks, the adjoining faces of said disks having cams operable to increase the spring pressure, an apertured adjusting nut threaded in the outer end of said axial bore and engageable with said spring, and a finger secured to said arm and projecting inwardly through the aperture in said nut, and non-rotatively engaged with said second cam disk.

Signed at Seattle, King County, Washington, this 17th day of May, 1922.

HARRY R. MITCHELL.